8736½X
O. Mack,
Bee Hive.
Patented Apr: 2. 1835.
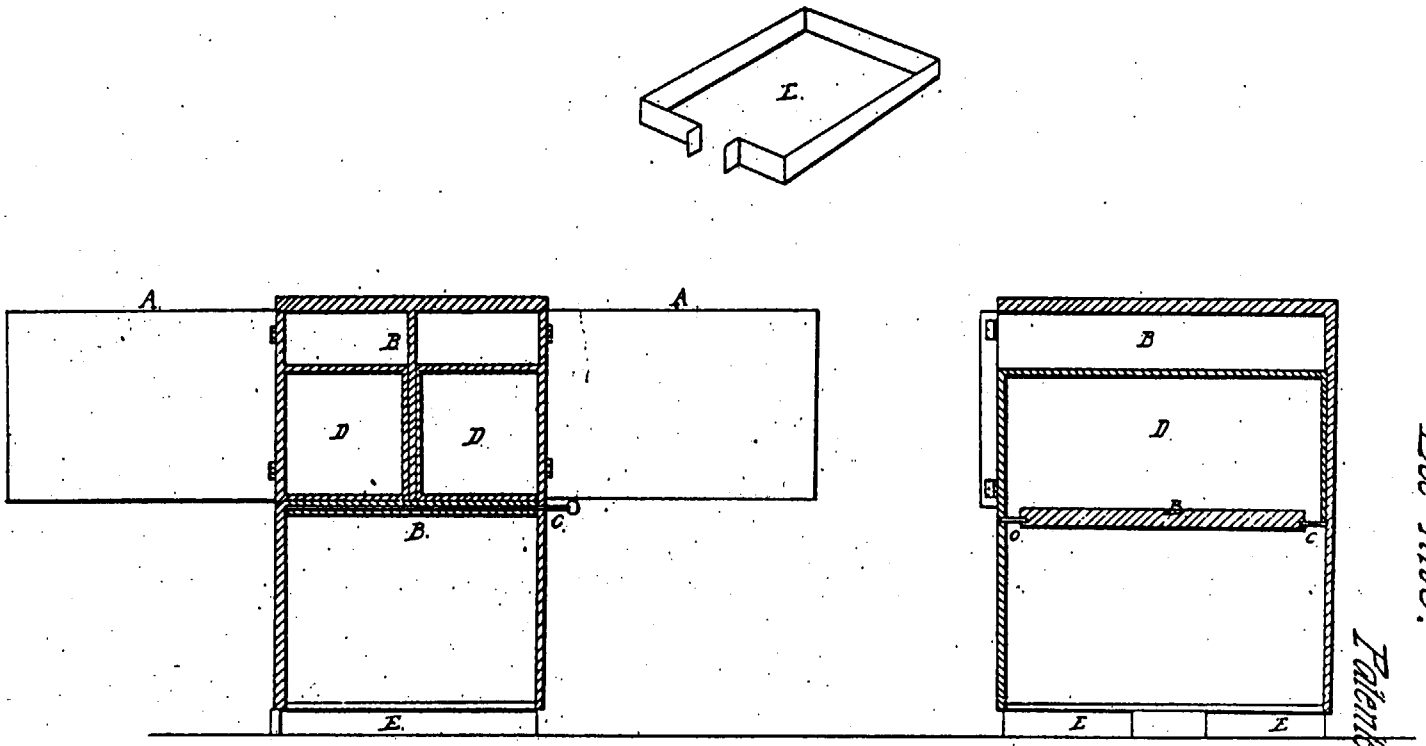

8736½X Apl 2. 1835

Orlando Mack of Gilsum New Hampshire
Patented April 2d 1835.—

Letters Patent

The Schedule referred to in these Letters Patent and making part of the same containing a description in the words of the said Orlando Mack himself of his improvement in the construction of a Bee hive To all to whom these presents shall come. Be it known that I Orlando Mack of Gilsum in the County of Cheshire and State of New Hampshire, have invented a new and useful improvement in the con struction of a Bee hive. and that the following is a full and exact de= scription of the construction thereof as improved by me.
The improved Bee Hive is called the secretary Bee Hive. It is composed of boards in several parts. but for ease of description it may be taken to be eighteen inches high. and twelve inches square top and bottom inside having two doors, one on the front and one - on the back. both swing ing one way. These doors should extend from the top board of the hive downward eight inches and the whole width of the Hive. Put a partition across the Hive parallel with the bottom of the doors. ten inches wide dividing into two parts, upper and lower & leaving a space of three fourths of an inch between the edges of the partition board & the sides of the Hive. In each edge of this partition board there should be a groove. one twelfth of an inch in width and one fourth deep running the whole length of the board. Then in the edges of one of the plank pieces on which the doors are hung. cut horizontally, and parallel with the abovementioned grooves two holes one on each edge of the board one inch in width and one twelfth of an inch in diameter. Make two knives or slides fourteen inches long. exclusive of the handles one inch in width and one twelfth thick. Then by inserting these slides into the last mentioned holes and sliding them endways in the grooves in the edges of the partition board. the vacancy between the sides of the Hive and the edges of the partition board is stoped. The upper part of the Hive should then be divided into two equal parts by putting a board

[illegible]

8736½X perpendicularly and parallel with the doors. so that each door shall open in
into a seperate part. These two seperate parts or chambers as they may
be called. may be filled with boxes or draws having one on each side long
enough to fill up the chamber. or several smaller ones. or none at all.
These draws should be made with front sides end top and bottom.
there must be a space of about three fourths of an inch between the
bottom board. and the front of the draw so that by taking out the slides
the hole in the bottom of the draw will come directly over the ones which
the slides stop leaving a free passage for the Bees out of the lower part
of the hive into these draws. The Bees will then fill these draws with
comb & Honey. Then by sliping these slides and stopping the bees
from passing up you may take out the draws and and place in new
ones. and in this way by changing the draws when they are filled you
may take fifty pounds of honey without injuring the Bees. in one
season, if the season is favourable. When the draws are put in the slides,
slides should be taken out and the doors shut, and when the draws
are taken out. the slides should be put in and the doors opened.
Then the Bees will come out and go into the lower part of the Hive
If the Bees should not lay in honey enough in the lower part of the hive
To keep them through the winter season. draws that have been taken
out can be replaced in the hive again that the Bees have filled.
Another part of the Hive is what may be called a moth defender it
is a piece of thin iron say the thirtieth part of an inch in thickness
and one inch wide. this should be bent flat ways into a square form
nearly as large as the bottom of the Hive. The ends of this hoop as it
may be called should not meet each other into two inches & a half
leaving a space in the centre of one side of the hoop [illegible] one fourth of
an inch on each end directly out from the centre so that the space
in the side of the hoop may be three inches in length. the edge of this
hoop must then be [illegible] into the bottom of the hive [illegible] enough to
hold it in firmly having the space come on the front side of the Hive
and the ends even with the inner surface of the front board. The lower
edge of the hoop must [illegible] to the [illegible] the Bees may

8736½X go under through the space in the hoop. Then there is no chance for the Bee moth or miller to lay their nits under the edge of the Hive.
The Bee moth is the great foe of the honey Bee. One which neither the instinctive powers of self preservation with which the Bee is endued is able to resist nor heretofore — the ingenuity and skill of man has not been able effectually to provide against. There may be a slide door made of tin with small holes sufficient to let in the air into the hive so as to shut the bees into the hive or others out in case of robbing. What I claim as my invention and for which I ask an exclusive privilige is the mode of constructing a Bee Hive with apartments in such a manner. as by the use of a slide to shut the Bees from different apartments and thereby take out Honey at any time without Robbing the Bees. Also the construction of an iron hoop attached to the bottom of the hive so as to prevent the ^Bee^ miller or moth from getting into the Hive.

Witnesses
Solomon Mack
Geo. W. Hammond

Orlando Mack

[illegible]

(1106 words)